US006355191B1

(12) United States Patent
Toncelli (10) Patent No.: US 6,355,191 B1
(45) Date of Patent: *Mar. 12, 2002

(54) METHOD AND APPARATUS FOR THE MANUFACTURE OF CEMENTITIOUS SLAB PRODUCTS

(76) Inventor: Marcello Toncelli, Via Papa Giovanni XXIII, 2 Bassano del Grappa (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/913,100

(22) PCT Filed: Jan. 27, 1997

(86) PCT No.: PCT/EP97/00444

§ 371 Date: Sep. 8, 1997

§ 102(e) Date: Sep. 8, 1997

(87) PCT Pub. No.: WO97/27982

PCT Pub. Date: Aug. 7, 1997

(30) Foreign Application Priority Data

Jan. 29, 1996 (IT) .......................... TV96A0009
Jan. 29, 1996 (IT) .......................... TV96A0010

(51) Int. Cl.[7] .......................... B29C 39/42; B29C 39/44; B28B 1/087; B28B 7/44
(52) U.S. Cl. .................... 264/40.4; 264/40.1; 264/71; 264/72; 264/102; 264/297.9; 264/333; 425/86; 425/162; 425/405.1; 425/432; 425/434; 106/723; 106/738
(58) Field of Search .......................... 264/72, 102, 71, 264/297.9, 333, 40.4, 40.1; 106/723, 738; 425/86, 432, 434, 405.1, DIG. 60, 162

(56) References Cited

U.S. PATENT DOCUMENTS 3,247,299 A    4/1966   Zaha
3,872,204 A  * 3/1975   Yano et al. .................. 264/102
3,917,781 A   11/1975   Gabriel et al.
4,036,922 A  * 7/1977   Ito et al. ..................... 264/102
4,059,376 A   11/1977   Ito et al.
4,362,679 A  * 12/1982  Malinowski .................. 264/82
4,473,673 A  * 9/1984   Williams et al. ............. 264/102
4,482,515 A  * 11/1984  Buhler et al. ............... 264/102
4,544,345 A  * 10/1985  Buhler et al. ............... 264/102
4,698,010 A   10/1987   Toncelli
4,909,974 A  * 3/1990   Toncelli ........................ 264/71
5,358,676 A  * 10/1994  Jennings et al. ............ 264/102
5,702,651 A  * 12/1997  Bean et al. ..................... 264/34
5,928,585 A  * 7/1999   Toncelli ........................ 264/71

FOREIGN PATENT DOCUMENTS

| CH | 473739    | 7/1969  |
| EP | 0 378 275 | 7/1990  |
| FR | 992896    | 10/1951 |
| FR | 1408495   | 7/1965  |
| FR | 1539644   | 8/1968  |
| FR | 2 668 417 | 4/1992  |

* cited by examiner

Primary Examiner—Jan H. Silbaugh
Assistant Examiner—Michael I. Poe
(74) Attorney, Agent, or Firm—J. Harold Nissen; Lackenbach Siegel (57) ABSTRACT

A method and apparatus for preparing single layer tiles or slabs from a mixture of a granulated stone material having a selected particle size, and from a slurry formed by cement, a quantity of between 0.25 and 0.36 parts by weight of water relative to the weight of cement, and a plasticizer for cementitious slurries, in which the quantity of slurry added is slightly in excess of the quantity corresponding to the void fraction of the granulated material, in forming mould, containing a layer of predetermined thickness of the mixture, to be subjected to a first very short deaeration step under the effect of a very high vacuum and to a subsequent vibration step under a lower vacuum, after which the mould goes on to seeing and hardness steps.

30 Claims, 5 Drawing Sheets

METHOD AND APPARATUS FOR THE MANUFACTURE OF CEMENTITIOUS SLAB PRODUCTS

The present invention relates to artificial stone products in form of slabs or blocks consisting of a granulated stone material bound by means of a cementitious binding, useful for pavings and wall coverings.

The invention also relates to a method and apparatus for their production.

It is known that, for many centuries, natural stone materials such as marble, granite, etc. have been used in the form of slabs and panels both for paving and for wall claddings.

Natural stone materials are extracted from quarries in the form of blocks and the blocks are subjected to an operative cycle which provides for many operations and processes such as, for example, sawing, facing, polishing, etc.

Alongside their unquestionable aesthetic properties and their equally undeniable mechanical properties, however, natural stone materials have some problems and disadvantages.

In the first place every block extracted from a quarry differs, sometimes slightly, but also sometimes considerably from blocks extracted from the same quarry, so that it is not possible to produce floors or claddings with large surface areas which do not have considerable aesthetic and/or colour differences. In the second place, even at the stage of the extraction of blocks from quarries, a considerable portion of the material excavated or extracted, for example, by blasting, remains unused or becomes unusable in the course of processing.

By way of example, it may be mentioned that the percentage of the stone material excavated from quarries which is used, that is, which is sent in the form of blocks for subsequent processing does not exceed 20–30%, with obvious wastage which is not only disadvantageous from an industrial point of view but also constitutes a factor in environmental pollution and in the disfiguring of the landscape in the regions surrounding quarries.

Attempts have been made in the past and are still being made today to use this resulting stone material (that is, the aforementioned 70% which is not used directly) in the manufacture of artificial stone products.

In order to solve this problem several solutions have been proposed and practiced, which can be classified in two main groups or approaches. A first approach consists in the manufacture of so-called "terrazzo" cementitious products or tiles which are constituted essentially by granulated natural stone material dispersed in a cementitious matrix.

The particular method used for this product produces tiles which are very thick (particularly relative to the dimensions of the individual tiles) and consequently also heavy which, naturally, is disadvantageous with regard to their subsequent handing, particularly at the stage when the tiles are laid.

A "terrazzo" tile generally has dimensions of 40×40 cm (with thicknesses of no less than 3.5 cm) or 30×30 cm (with thickness of 2.7 cm) or other less commonly-used dimensions.

Moreover, their mechanical properties are relatively poor.

In fact, the flexural strength (9.5–10 N/sq.mm) and the abrasion resistance (560–580 cu.mm.) values are certainly not high, whilst water absorbtion reaches 9–10% by weight.

A further disadvantage of this cementitious product lies in its appearance which reveals the presence of the cementitious binding in which the granulated material is incorporated so that, from an aesthetic point of view, "terrazzo" tiles have never been held in gear esteem and their widespread use is due mainly to their cheapness.

Each tile is produced individually by a method which provides for the following steps:

(1) a layer of a starting mixture or mix, constituted by (a) the inert granulated material reduced to the desired particle size beforehand, and (b) a cementitious binding formed by cement and water in which the percentage of water is decidedly in excess of the quantity normally necessary to achieve the binding effect, is spread on the base of a mould and subjected to slight vibration for several seconds;

(2) a second layer of very lean cementitious binding barely moistened with water is placed on top of this first layer (which is intended to form the so-called visible face of the tile);

(3) a pressure is applied over this second layer so as to force the excess water present in the first layer to be transferred into the overlying layer to make up its water percentage to values suitable for bringing about the subsequent setting and hardening steps;

(4) the product is extracted from the mould and is allowed to rest for the time necessary for setting to take place on tables or shelving where it is also left for the time necessary to complete the hardening step (usually about 25 days).

With reference to the manufacturing of tiles or slabs, in more recent years, industrial investigations and developments have been carried out in relation to industrial methods in which a granular filler of stone material, usually the waste from the excavation of natural stone materials, brought to a suitable particle size beforehand, is mixed in suitable proportions with a binding either of a cementitious nature or constituted by a setting synthetic resin.

The resulting mixture is subjected to a first forming step, for example, by the filling of suitable moulds or similar forming devices so as to form a layer of the desired thickness.

The mould or forming device is then subjected to a mechanical compaction operation (preferably by the action of a plate press) with the simultaneous application of a vibratory motion, the mould being kept under vacuum.

Upon completion of this step, which lasts for a few minutes, a hardening step takes place in a manner which depends upon the nature of the binding.

More specifically, in the case of the cementitious binding, this is a conventional setting and subsequent hardening step for which the product is left to rest for the necessary time.

In the case of a binding constituted by synthetic resin, however, hardening takes place in a short time in the presence of a catalyst with the application of heat, or cold by the joint action of a catalyst and a promoter;

This method is advantageous, not only because of its compatibility with modern industrial production standards but also, and above all, because it leads to decidedly more advantageous products.

Amongst the advantages it should be pointed out, in the first place, that it is possible to manufacture slabs of truly considerable dimensions much larger than those of "terrazzo" tiles and also larger than tiles or products made of natural stone materials.

In the second place, the resulting product has a completely homogeneous appearance so that it is possible to produce very large floors or external claddings for buildings.

In the third place, the mechanical characteristics of the resulting slabs are decidedly better than those of "terrazzo" tiles.

The second approach is that of the manufacturing of blocks having size comparable with that of the blocks obtained by excavation from quarries, to be later sawed into slabs.

In the common practice the manufacturing of blocks of stone materials has been and is practiced by prevailingly using calcareous stone materials (since these materials, differently from siliceous materials like granite, can be easily sawed by means of tools bearing diamond insert segments) and Portland cement or more generally hydraulic bindings having a cementing function.

Unfortunately these blocks show the same disadvantageous features of the already mentioned cementitious products, since in their production cement slurries must be used containing water excess, owing to the need of using fluid mixtures capable of readily filling the interstices between the particles of granulated natural stone.

By the way the water excess with respect to the cement causes the mechanical properties of the products to be heavily lowered and moreover the slabs obtained from the blocks undergo diffused fissures caused by the alternated shrinkage and dilatation of the product, these phoenomena being increased by the excessive porosity of the product originated by the evaporation of the too much excess water and by the reduced mechanical resistance of the product deriving from such an excess.

The filled in forms are subjected to vibrations applied to the base and/or to the walls of the forms, in order to compact the slurry likewise a concrete casting.

The excess water causes the "bleeding" effect, namely the separation of water from cement, with a surface floating and (which is even more serious) such a separation takes also place within the single interstices wherein the interface between the binding mix and the surface of the particle of stone material sometimes consists of water only.

The use of plasticizing additives in this type of process is not much useful since the slurry, although being more fluid, gains a plastic state hindering the deaeration of the mixture needed before the setting.

As a consequence products are obtained filled with air bubbles which appear onto the surface of the slabs obtained by sawing in form of holes having diameters variable from a few thousandths of a millimeter to some millimeters.

In the technical panorama related to the manufacturing of blocks of stone material, besides the above process, the U.S. Pat. No. 4,698,010 can be cited (wherein moreover other patents are summarized being part of the prior art); therein a process is described for the manufacturing of blocks starting from stone material of various particle size and from a binding, comprising an initial mixing step in which stone material, in form of powder and/or granulated, and a binding are mixed under vacuum; thereafter the mixture is transferred into a form which is given an alternated motion to obtain an uniform and homogeneous distribution of the mixture within the form; the latter, still remaining under vacuum, is then transferred into a chamber, also kept under vacuum, in which it is subjected to the action of a compacting press in combination with a vibratory motion of predetermined frequency.

The subsequent and final phase which is that of the setting and hardenings, depends also in this case on the nature of the binding, namely on whether it is a hardenable resin or a cementitious binding, whereby the considerations already made with respect to these two types of binding still hold true, with the self evident differences determined by the size of the blocks.

Thus the main subject of the present invention is the production of products in which natural stone materials in granulated form and a cementitious binding are used, and which are not subject to problems of excessive unit weight or too great a thickness, or to the aesthetic disadvantages described briefly above with reference to known solutions.

In the production of the products constituting the subject set out above, the main problem which has not been solved satisfactorily up to now is that of the filling of the voids, that is, the empty spaces, which are created or remain between the particles of a granulated material when it occupies a certain closed space or volume.

In fact, the greater the degree of filling, the closer the properties and also the appearance of the resulting cementitious product comes to a natural stone material.

Now, if one takes the aforementioned closed volume or space containing a certain quantity of granulated material, the nature, particularly the dimensions, of the voids or interstices between the particles naturally depends upon the size of the particles, so that the void fraction, and hence the volume of the interstices to be filled with the cementitious binding, also depends upon the particle size.

The cementitious binding in turn consists basically of cement powder and water.

There is a known quantity of water which is necessary so that the reactions which characterize the setting and hardening of a cement can take place.

However, this quantity of water is not sufficient to confer on the cement and water slurry even a minimal workability or fluidity so that, in normal techniques for the manufacture of cement products, the quantity of water added in the preparation of the slurry is in excess of that necessary for the hydration of the cement.

This excess in turn has to be the smallest possible excess consistent with the workability of the mix since, in the final analysis, the excess water detracts from the compactness, and hence from the mechanical properties of the final cementitious product, the porosity of which is increased.

With reference once more to the preparation of the product made of stone material in granular form and cementitious binding to which the present invention relates, if a cement and water slurry containing the quantity of water sufficient for the hydration of the cement were used to fill the voids, this slurry would be very dense and would have insufficient workability or fluidity to fill the interstices between the granules of inert stone material by flowing.

If, one the other hand, the optimal degree of filling were to be obtained, the initial water and cement slurry would have to contain an excess percentage of water, as mentioned above, to the detriment of the mechanical properties of the cementitious matrix of the final product and hence of the product itself.

In order to have a more precise idea of the values involved, it suffices to consider that a slurry which is almost ideal for producing a cement product having satisfactory characteristics and properties would have to have a water content of less than 0.315 parts by weight relative to the weight of cements, whereas the percentage of water in order to achieve satisfactory fluidity of the slurry such as to ensure a satisfactory degree of filling of the interstices of a granulated material would generally have to be greater than 0.55 parts by weight, again relative to the weight of cement and, in this case, the mechanical properties of the final product would undoubtedly be poor.

It is precisely the contradictory nature of these two situations which led, in the prior solutions investigated and implemented, in the case of "terrazzo" tiles, to the use of a mixture with a large excess of water in the cementitious slurry filling the voids of the granulated material, with subsequent recourse to the measure of a second layer of a mixture lacking in water so as to balance the water content of the cementitious binding as a whole.

However, although this measure achieves an adequate degree of filling of the voids of the initial granulated material, it is impossible to prevent the final product from having a very great thickness and weight relative to its dimensions and, moreover, from having at least mediocre mechanical properties.

Thus, before the present invention, an industrially satisfactory solution to the problem had not been found.

Moreover, in recent years, water reducing or plasticizing additives have come into use for cementitious slurries, with the purpose of conferring greater fluidity on slurries containing cement and water in the optimal ratio, since otherwise they are pasty and therefore not fluid.

With the present invention, however, the optimal solution has been found for the production of cementitious products comprising a granulated natural stone material and a cementitious matrix filling the voids and the interstices of the granulated material, the products having:

(i) in the case of slab product, thicknesses much less than those of directly comparable products of the prior art having the same composition, and in the case of blocks, the possibility of being sawed in form of big size slabs of thickness definitely less than that of the slabs which can be obtained by sawing from blocks produced according to the known art and directly comparable as having analogous composition;

(ii) excellent physical and mechanical properties, particularly porosity and flexural strength, of the same order as those obtainable by the most recent methods based on the vibratory compaction of mixtures of granulated material and cementitious binding under vacuum, (iii) an appearance very similar to that of the natural stone material from which the starting granulated material is formed, and (iv) dimensions also definitely larger than those of conventional tiles, for example of the "terrazzo" type.

In order to produce the product with the characteristics mentioned above, the present invention consists of a method which provides for the following steps:

a) provision of a granulated material having a predetermined and controlled particle size and calculation of its void ratio or fraction, b) preparation of a water and cement binding mix having a water content of between 0.25 and 0.36 parts by weight relative to the weight of cement, preferably between 0.28 and 0.32 parts by weight, the binding mix being supplemented with a quantity of a known plasticizing additive for cementitious slurries such that, when the mix is poured onto a surface in order to carry out the "mini slump test", it has a fluidity such that it is arranged in a very thin layer with a roundish shape having a diameter of about 20 cm and there is no apparent separation between the water and the cement with the deposition of the cement in the bottom of the mould and the appearance of the water on the surface, c) intimate mixing of the granulated material and of a quantity of cementitious binding mix such as to be slightly in excess of the void fraction of the granulated material, said mixing being carried out under vacuum when the product to be obtained has a thickness not less than 5 cm, d) spreading of the resulting mixture in a mould or similar forming device to form a layer of the desired thickness, said spreading being effected under vacuum if the mixing has taken place under vacuum;

e) application of a very high vacuum to the mixture contained in the mould for a period which is very short but long enough to bring about substantially complete deaeration of the interstices and to remove all of any air remaining incorporated in the starting mixture, f) application for few minutes of a vibratory motion with a frequency of between 2000 and 4800 cycles/min. to the deaerated layer under a vacuum lower than that of previous step said vacuum being not lower than 80 mm Hg and in the case of slabs having thickness not higher than 5 cm the application of the vibratory motion taking place for a period of at least 60 seconds, g) transfer of the mould to a setting and initial hardening section, and h) removal of the product from the mould and keeping of the product on shelves for final hardening.

In the case of products having thickness greater than 5 cm and more specifically of blocks, said step (g) includes the permanence in said setting and initial hardening section for at least 8 hours and said step (h) comprises a first phase (h1) of initial hardening having a duration of about 7 days, in which the product is protected to avoid the water evaporation, and a second phase (h2) for the completion of the hardening for the necessary number of days, said hardening being carried out either on the block as such or on the slabs obtained from the block sawing at the end of the initial hardening phase (h1).

In the foregoing definition, the expression "mini slump test" means the simplified form of the slump test according to the method defined by the UNI 9418 standards.

By way of illustration, it can be shown that if equal volumes of water and cement are mixed, a mixture or binding mix containing 0.32 parts by weight of water relative to the weight of cement is obtained. If one takes a granulated material resulting, for example, from the milling of marble, with a particle size of between 0.1 and 6 mm, it has a void fraction of 26% by volume, so that this is the theoretical quantity of cementitious binding mix to be added. The actual quantity of binding mix to be added in this case is increased to about 29% by volume.

Should it be desired to increase the quantity of cement binding mix for filling the interstices, for example, if the void fraction were to increase, so that the quantity of mix would increase correspondingly, the possible use of inert materials in finely milled form (for example, calcium carbonate) is foreseen, in order to keep the quantity of cement sufficiently low by replacing some of it with an inert material.

Finally, it should be pointed out that other additives, for example, the usual cement, dyes, may also be added to the cement and water binding mix, for example, when particular colour or decorative effects are sought.

With regard to the water reducing or plasticizing additive which improves the workability and hence the fluidity of the cementitious binding mix to be mixed with the granulated material, these additives are well known in the art.

Examples of these additives are the so-called super plasticizers based on naphthalene sulphonic compounds, based on melamine, or based on acrylic polymers.

Among them there can be cited those obtained through copolymerization of acrylic acid such as "TERAFLUID 001" is a Trademark registered in Itraly, and owned by Mr. Luca Toncelli, used by the Italian company Breton Spa; "MAPEFLUID® X P404" of the Italian company Mapei Spa, and is a trademark designating a "liquid fluidizer for high-quality concrete . . . based on non-sulphonated acrylic polymers and free of formaldehyde," or those having naphtalensulfonic base such as "RHEOBUILD 2000" of the Swiss company Mac-Master and it is known that "RHEOBUILD" is a registered trademark, but it is believed that "2000" is a grade name. According to the material safety data sheet issued by sales company MBT Holding AG, Switzerland, belonging to the SKW Group, Trostberg, Germany, this is an "aqueous solution containing salt of polynaphthalenemethanesulphonic acid," or lastly, those having melamine basis such as "MELMENT 1.30" of the German Company SKW and it is known that "MELMENT" is a registered trademark, but it is believed that "130" is a grade name. According to a brochure issued by the producer SKW Chemicals, also belonging to the SKW Group, it is "a synthetic polymer based on melamine commonly referred to as a superplasticizer and a high range water reducer, which is an essential component of products based on portland cement and gypsum. The brochure states that MELMENT is commercially available in various grades but grade "1.30" is not listed. This was a grade available when the priority patent Application of the present U.S. Application was filed in Italy, namely in the year 1996.

With regard, more specifically, to the individual steps of the method of the invention as defined above, the first aspect which is worthy of more specific comment is that of the selection of the starting granulated material.

As already mentioned, one of the advantageous aspects of the present invention lies in the fact that waste stone material such as the resulting from operations to excavate blocks of natural stone material is fully reused.

If the starting granulated material is homogeneous and thus resulting from the same starting stone material, the optimal condition consists in the crushing and milling of the stone material to a maximum particle size no greater than 6 mm (although, in some cases, this maximum size may reach 8 mm) and the subsequent sue of the granulated material resulting from the milling as it is (run of mill).

If, on the other hand, the starting granulated material is not homogeneous, or if it is desired, for example, in order to achieve particular colour or aesthetic effects, to mix stone materials of different origins and provenance, in this case, the composition of the starting granulated material may be pre-arranged by the application of one of the usual formulae for calculating the composition and particle-size distribution used in the field of cementitious products with reference to the inert component.

Examples of these formulae are Fuller Thompson's formulae, or Bolomey's formula. For the Fuller-Thompson formula, see N. B. Fuller, S. E. Thompson, Transactions ASCE, 59, 67 (1907). For Bolomey's formula, see J. Bolomey, Revue Mater, Costr. Trav. Publ., ed. C, page 147 (1947) as regards the Bolomey's formula, and these are discussed, for example, in M. Collepardi, Scienza e tecnologia del calcestruzzo, (Science and technology of concrete) pp. 292–303, editor Hoepli.

Once the starting granulated material and its composition and particle-size distribution have been identified, its void fraction can be calculated, for example, by formula 7.12 of the text indicated above.

The quantity of cementitious binding mix which is theoretically sufficient to fill the voids and interstices can be identified upon the basis of this void fraction.

As already stressed in the definition of the method of the present invention, the quantity of binding mix actually used will be slightly in excess of this theoretical quantity, but this excess does not have to be such as to lead, upon completion of the method, to the formation of an independent layer constituted by cement alone on one of the two faces of the product. In practice, the excess is normally of the order of 10% of the initial volume of cementitious binding mix related to the total volume of the mixture of granulated material and cementitious binding mix.

With regard now to the other steps of the method, these in the case of the direct manufacturing of slabs provide, in the first place, for the pouring and/or spreading of a layer of the mixture of granulated material and binding mix onto the base of a mould which may, for example, consist of a tray having the desired dimensions of the final slab. This layer is spread in a thickness substantially corresponding to that of the final slab or product; in the preferred embodiment, this thickness will be of the order of 15–20 mm, most preferably 17 mm.

Once the mixture has been poured into the mould, it is subjected to a forced deaeration step by the introduction of the mould into an environment under vacuum in which a high vacuum which should be no less than 40 mm Hg. is formed.

This deaeration step should be very short and, in experimental tests it was found that it should preferably last no longer than 20 seconds. This short duration is necessary owing to the requirement to prevent the water from boiling with the formation of steam bubbles causing imperfect compaction to the detriment of the final compactness and mechanical properties of the product.

Upon completion of the step of deaeration under a high vacuum, the mould containing the layer of mixture, now deaerated, is subjected to vibration at a predetermined frequency, with the mould still kept under a vacuum lower than that of the deaeration step and preferably of the order of 70–80 mm Hg, to prevent the water of the mix from boiling.

The duration of the vibration treatment under vacuum is of the order of a few tens of seconds, preferably about three minutes.

Although this remark should not be understood in a limiting sense, it seems plausible to consider that the application of the vibration under vacuum to the deaerated mixture leads to a relative settling of the particles of granulated material and to better copenetration or surface "closing" thereof ("closing" meaning that the surface of the product or slab has very small regions of cementitious binding in view) since the particles can perform microscopic movements without being obstructed by the friction which would obstruct the same settling thereof in the absence of the cementitious binding mix which thus also acts so as substantially to reduce friction, naturally as well as constituting the filling of the interstices of the granulated material.

With regard to the method defined above, another aspect is worth noting, and that is the fact that setting and initial hardening occurs about 8 hours after the start of this step and complete hardening to an extent sufficient for the mechanical removal of the product from the mould generally occurs within 24 hours.

In the case of the manufacturing of products having thickness greater than 5 cm and particularly of blocks, the mixing takes place under a controlled vacuum so as to prevent in this phase the mixture, which subsequently fills the form, from containing air the removal of which, owing to the dimensions of the block and thus of the form, is very problematic and almost impossible with the known methods.

Moreover, with respect to the setting or hardening phase, it is to be observed that it includes first of all the maintaining at rest of the block, upon being extracted from the form, preferably in a way to have it protected by an envelope of waterproof material, such as to prevent the evaporation of water from the block to the surrounding atmosphere.

This phase has preferably a duration of at least 7 days and at this step it becomes possible to carry out the block sawing the hardening being possibly continued on the thus obtained raw slabs, and possibly carrying out the other finishing operations.

With reference now to the apparatus for implementing the method of the present invention, it comprises, as essential components:

(a) a raw material stocking and supply section comprising a number of silos and hoppers for the stocking of the raw materials for the preparation of the starting mixture and corresponding devices for the dosage of the single ingredients to a weighing equipment;

(b) a mixing section comprising a mixer in which the ingredients coming from said weighing equipment together with water, water reducing or plasticizing additive and other possible additives are thoroughly mixed;

(c) a section for the dosed and homogeneously uniform filling of at least one mould with the mixture formed in said mixer;

(d) a combined section for the deaeration and settling of the mixture present in said at least one forming mould, comprising first vacuum generating means adapted to have the surface of the mixture contained in said at least one mould subjected to a predetermined vacuum, means for controlling and regulated the vacuum acting onto said surface and vibration generating means adapted to apply to said mixture contained in said at least one mould a vibratory motion, having a frequency of between 2000 and 4800 cycles/min., preferably 3000 cycles/min. and for a short time, preferably of the order of 4–5 min.;

(e) a setting and initial hardening section for the setting and initial hardening of the product contained in said at least one mold, said setting and initial hardening taking preferably place at a temperature of between 25° C. and 35° C.;

(f) a section for the removal of the product from said at least one mould and for maintaining at rest the product for the hardening phase. According to the first embodiment of the above defined plant, with reference to the manufacturing of slab products having thickness not greater than 5 cm. and preferably of the order of 13–20 mm; said least one mould consists of a tray or preferably of a number of trays and said first vacuum generating means is said deaeration and settling combined section comprise a vacuum bell shaped tank which can engage the entire surface of the trays or trays containing said mixture, and said control and regulating means for the vacuum generated in said bell shaped tank are adapted to generate firstly said high vacuum of a value not less than 40 mm Hg before said vibratory motion is applied and then said vacuum less high than the previous one, of the order of 70 to 80 mm Hg, during the phase of vibratory motion application.

According to the second embodiment of the above defined plant, and thus with respect to the manufacturing of products having thickness higher than 5 cm and particularly of blocks, there are provided:

(b1) in said mixing section second vacuum generating means owing to which said mixing takes place under a controlled and regulated vacuum so as to prevent the water contained in the mixture from boiling;

(c1) said filling section consists of a forming chamber communicating through valve means with the discharge of said mixer, said chamber being adapted to temporarily receive a form and being provided with means to render uniform and homogeneous the distribution of said mixture in said form;

(f1) in said removal and maintaining section means are provided for the protection, during a first period of the block being hardened against the evaporation of the water towards the surrounding atmosphere.

As regards the mixer, this is preferably of the type having parallel horizontal shafts bearing radial arms, or it is of the orbital type with vertical shafts.

According to the preferred embodiment moreover, said mixer is fixed to the upper part of the forming chamber which, in turn, is preferably maintained under vacuum both during the transfer of the mixture from the mixer to the form and during the phase of vibratory motion application.

In turn the form is supported onto a saddle moveable with an alternated translation motion, whereby the mouth of the form is alternatively moved in horizontal direction with respect to the above discharge opening of the mixer and in this manner an uniform distribution of the mixture within the form is ensured. As regards specifically the phase of application of the vibratory motion, according to a first embodiment of the plant of the invention, the vibratory motion can be applied to the form supporting saddle within the filling chamber.

Alternatively this step is effected in a second chamber, which is external with respect to the vacuum chamber in which the form is filled with the mixture prepared in the cited mixer, and in that case in said second chamber which is into communication with the first one through a vacuum tight door and is too maintained under a predetermined vacuum not higher than 70 mm Hg, the form is supported onto a plane having connected thereto means for the generation of vibratory motion of the desire frequency.

In the enclosed drawings the plant according to the present invention is partly shown in schematic view. More specifically:

FIG. 1 shows the plant scheme for the manufacturing of slab products; FIG. 1 is composed of FIGS. 1A and 1B.

Figure 1A:
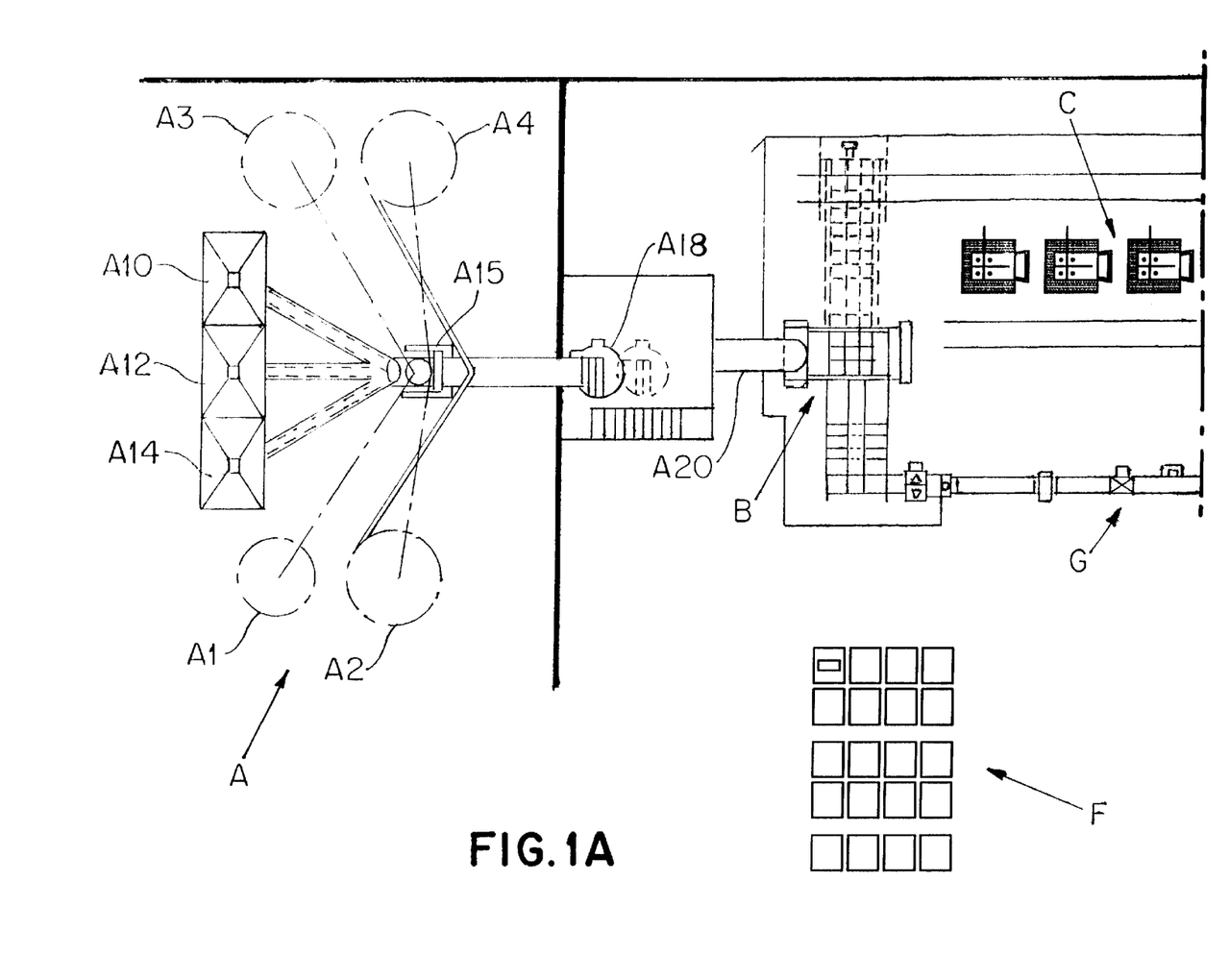
Figure 1B:
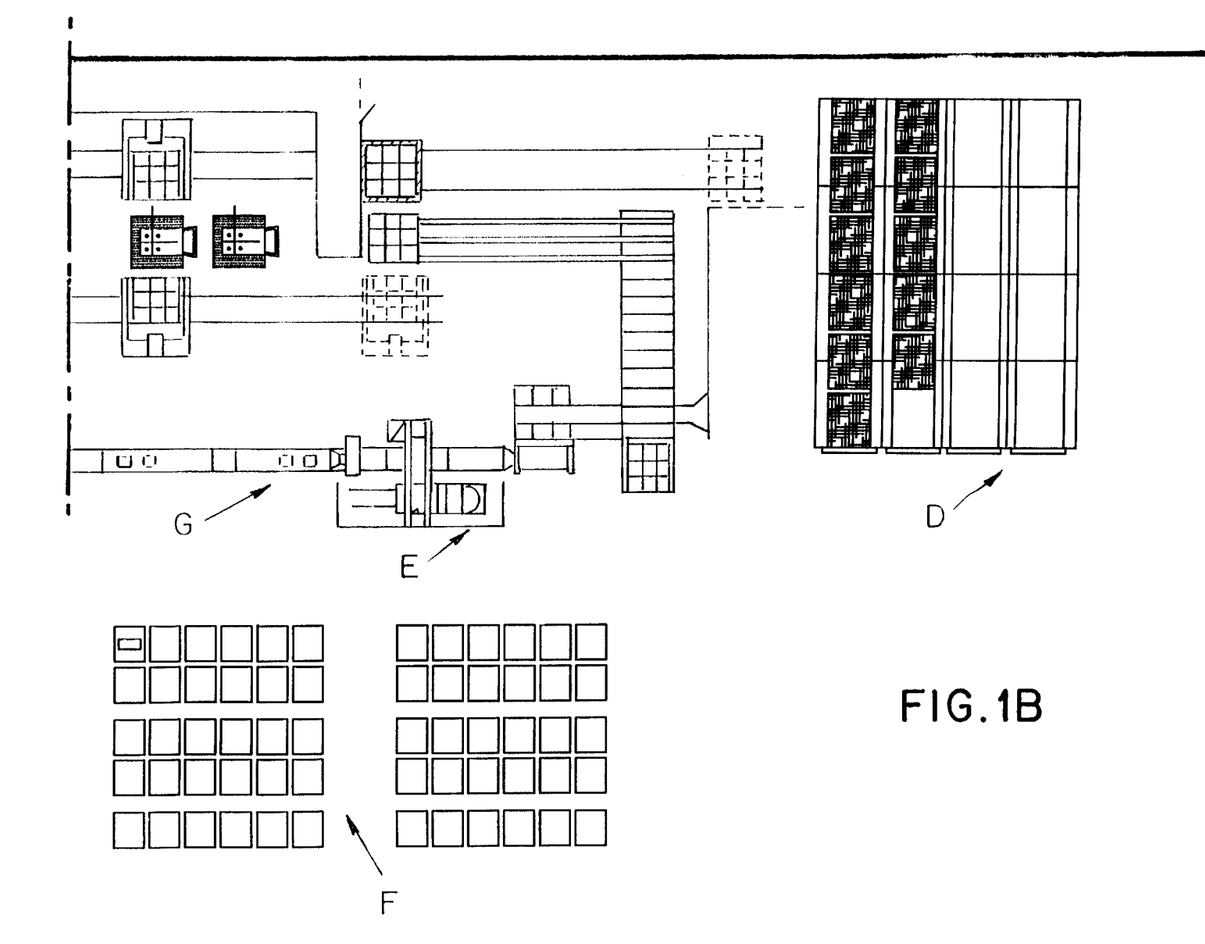

The apparatus for carrying out the process according to the present invention is schematically shown in FIG. 1 which is composed of FIGS. 1A and 1B in the essential parts thereof.

Considering firstly FIG. 1 a general plant layout is shown, relating to the manufacturing of slab products, comprising a section A for the stocking and dosing of the raw materials, comprising four silos, respectively A1, A2, A3 and A4, the first two of which are used respectively for the stocking of the granulated natural stone (0.1–0.3 mm) and of the powder of the same natural stone, whereas the silos A3 and A4 are used for the stocking of white and grey cement (depending on the production requirements). References A10, A12 and A14 indicate three hoppers, which are fed by means of a loading shovel.

A weighing and conveying band is fed from the silos A1 and A2 as well as from the three hoppers, whereas a dosing and weighing unit A16 is in direct communication with the cement stocking silos A3 and A4.

All the ingredients of the cementitious mixture, and therefor together with water and the other additives, among which mainly the plasticizer additive, are fed to an epicycloidal mixer A18 having a discharge channel A20 to convey the mixture coming out of the mixer to a section for the mould filling, generically indicated by the reference B.

In the case of the manufacturing of slabs and thus of products having thickness lower than 5 cm by mould there is meant of tray having the desired depth which is filled with a dosed, uniformly distributed amount of mixture, and thereafter the trays are transferred to the section C in which the phases of deaeration and application of vibratory motion under vacuum are carried out.

To this end each tray is brought under a vacuum bell in which in a first phase a high vacuum is applied under the above mentioned conditions (at least 40 mm Hg) and in the next step a vibration generating device is operated, the tray or mould being still maintained under a vacuum which however is less high than that of the first phase.

From section C the trays are transferred to a setting and first hardening section D consisting of a number of chambers in which the trays are maintained at rest for a time of the order of 24 hours.

Preferably in the chambers of setting and first hardening an atmosphere heated to about 35° C. is created, and more preferably these chambers are fed with steam so as to saturate the internal environment.

From the section D the trays containing the slab products are transferred to a unit E in which the slabs are removed from the trays and transferred to a hardening section F having a duration (as already mentioned) of several days. At the end of this phase the raw slabs are transferred to the standard operations of calibration, polishing and the like.

The trays from which the slabs have been removed are passed to a line for their cleaning, drying and spraying with a release agent, indicated on the whole by the reference G.

Figure 2:
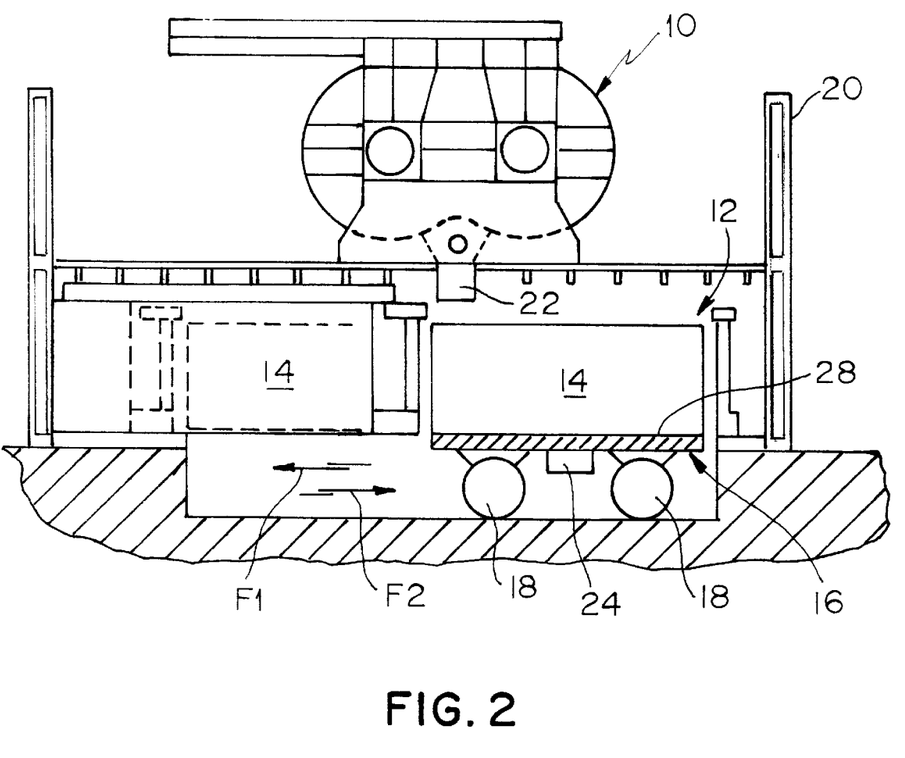
FIG. 2 schematically shows the plant for the manufacturing of block products according to a first embodiment thereof.

Turning now to FIG. 2 the part of the plant therein shown (the remaining parts being per se known) comprises a mixer 10 and a vacuum chamber 12, in which a form 14 is introduced, being supported onto the saddle 16. The saddle 16 is mounted on wheels 18, which are motor driven so that the saddle and therewith the form 14 is alternatively moved in the direction of the arrows, $F_1$ and $F_2$. In this manner, as clearly seen from the figure, the upper mouth of the form 14 is alternatively displaced between a first end position shown in FIG. 2 by full lines, and second end position shown in FIG. 2 by dashed lines.

The chamber 12 is defined by a casing 20 which not only defines and encompasses the chamber 12, but is also provided with side openings, for the entry and exit of the forms, in a per se known manner, these openings being obviously provided with suitable tight closing means owning to the fact that a substantial vacuum must be established in the chamber 12 as already mentioned.

The mixer 10 too is maintained in a per se known manner under the same vacuum generated in the chamber 12 and preferably by connecting both the mixer and the chamber to the same vacuum source (not shown).

The mixer 10 is provided with a discharge channel 22 having check valve means for instance of the lock type, so as to control the discharge of mixture from the mixer within the form.

In this embodiment the saddle 16 has connected thereto means for the vibratory motion generation, schematically represented by the reference 24, which are adapted to give to the plane 28 of the saddle 16 a vibratory motion and thus, through the form 14 abutting onto the saddle, to the mixture contained within the form.

It is evident that the mixing action taking place in the mixer 10, owing to the fact that it is effected under vacuum, has also the function of deaerating the resulting mixture or, to say it better, to prevent the mixture from incorporating air.

As a matter of fact the size of the form and thus of the mixture therein contained would almost totally hinder the removal of the air as determined by the vibratory motion applied to the mixture.

Figure 4:
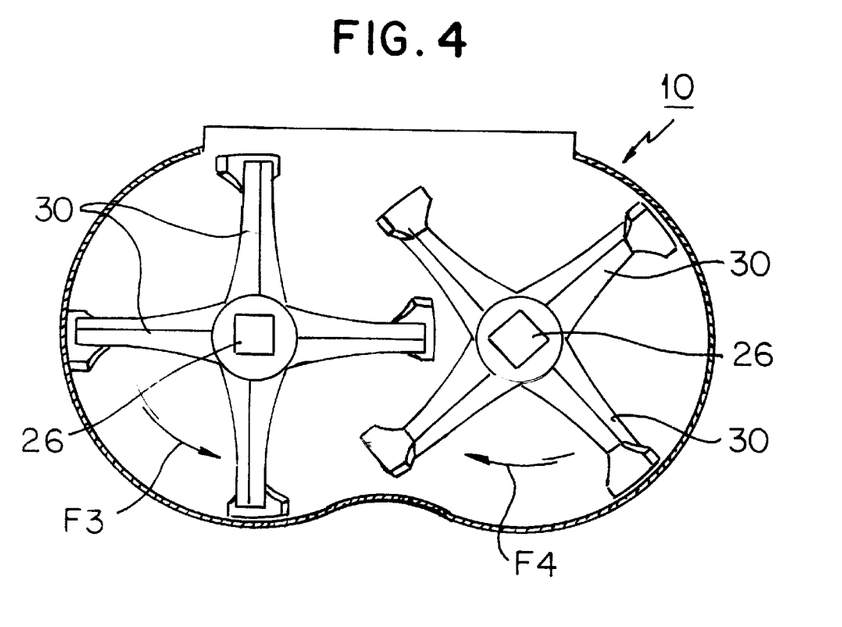
FIGS. 4 and 5 specifically show the mixer for the mixture preparation.
Figure 5:
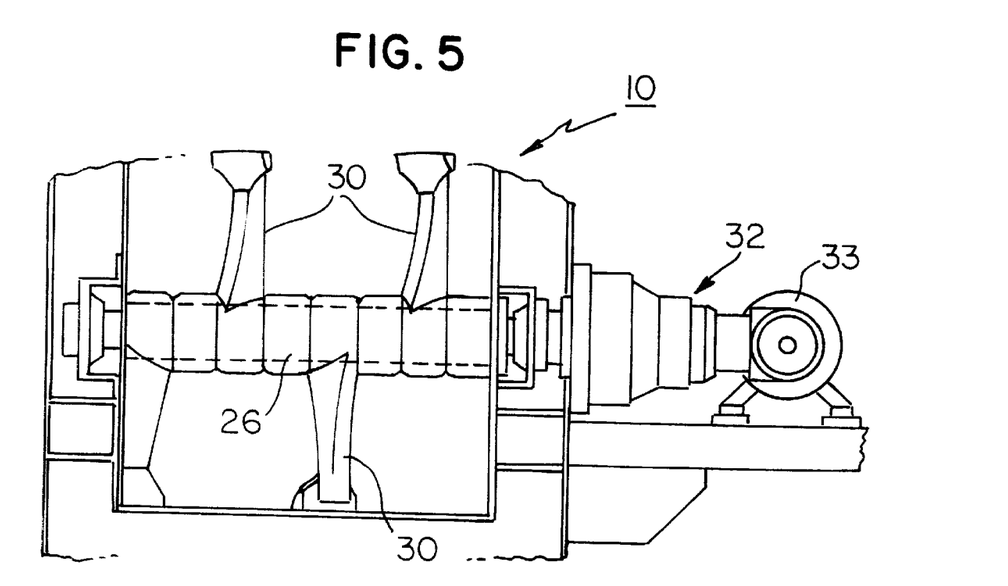

In the FIGS. 4 and 5 an embodiment of the mixer 10 is shown, comprising two horizontal and parallel shafts 26 from which arms 30 radially protrude.

Each shaft 26 rotates in the direction indicated by the arrows $F_3$ and $F_4$ respectively, the two shafts being driven by only one motor 33, by means of two reduction gears 32. Coming now to FIG. 3 in which parts corresponding to those of FIG. 2 are indicated by the same references, the form 14, once it has been homogeneously filled within the vacuum chamber 12, is transferred to another vacuum chamber 34, in which the form is abutted onto a plane 36 rigidly connected to a vibratory motion generator 38.

Figure 3:
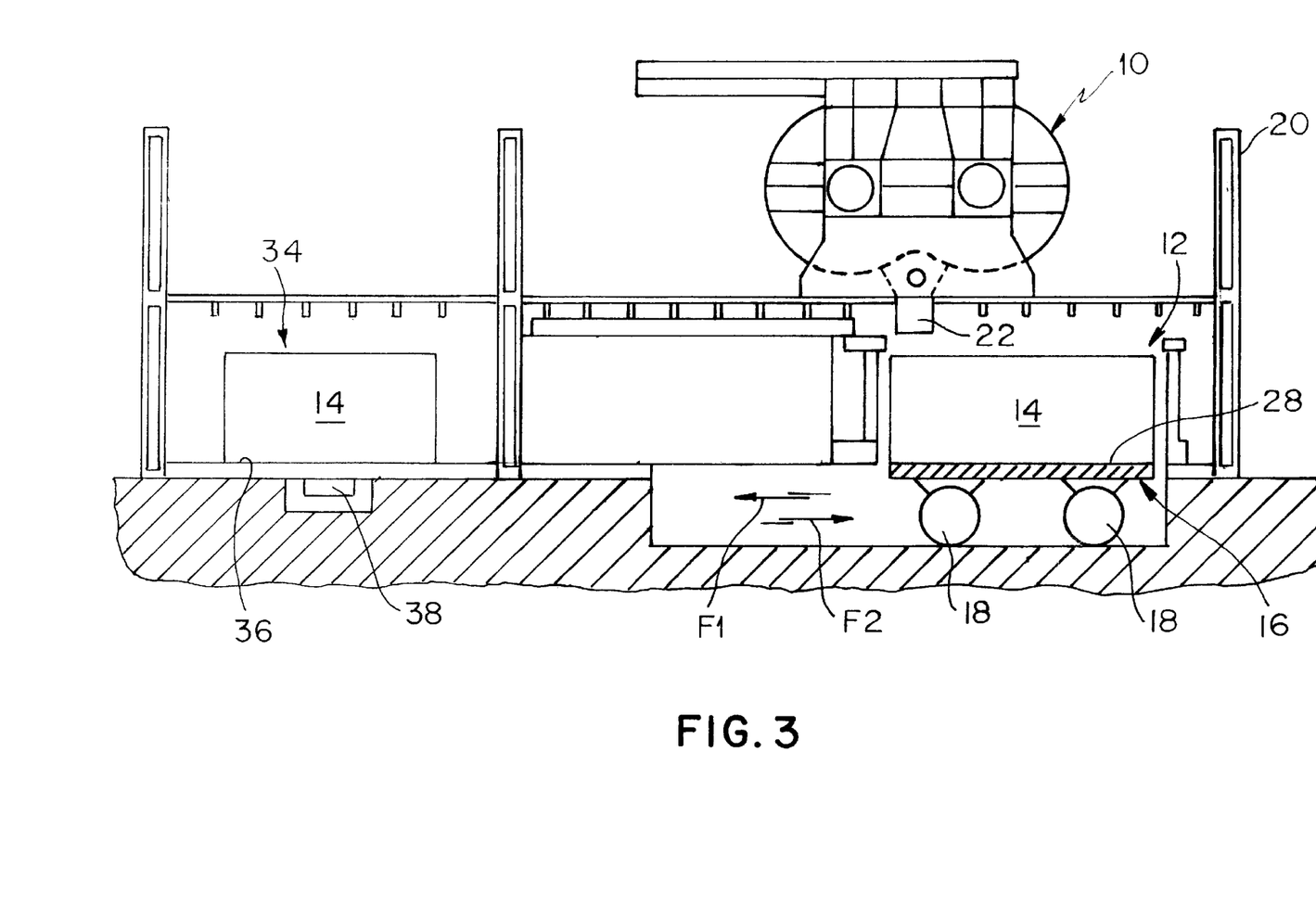
FIG. 3 schematically shows a plant alternative to that of FIG. 2 and relating to a second embodiment.

In this case too the vacuum acting in the chamber 34 is suitably controlled and regulated by connecting the chamber 34 to the same vacuum source operating for the chamber 12 and the mixer 10.

Coming back to the manufacturing of slabs of a thickness less than 5 cm by the method and the apparatus according to the present invention is possible to manufacture single-layer tiles (that is without a base layer) of marble-cement, granite-cement and other natural stone materials.

The use of granulated materials resulting from the milling of artificial products such as ceramic material can also be envisaged.

The resulting tiles have a small thickness of the order of 13–20 mm, although thicknesses up to 40 mm can be achieved for certain requirements, and dimensions which may reach 600×600 mm or more.

The degree of finishing of the resulting products is comparable to that of natural stone slabs and tiles since the usual sizing, grinding, chamfering and polishing treatments can be carried on the finished slabs.

Moreover, a suitable selection of the particle size of the starting granulated material, enables the resulting aesthetic effect to be varied. Furthermore, an examination of a cross-section of a slab produced by the method of the present invention shows that the granulated material is distributed homogenously throughout the thickness so that the slab is also characterized by completely istropic properties throughout its thickness as well as throughout its area.

With regard to the mechanical properties, the values given in the following table have been measured experimentally:

| BINDING AGGREGATE | PORTLAND CEMENT White 525 BOTTICINO MARBLE | | PORTLAND CEMENT Grey 450 BOTTICINO MARBLE | | STANDARD Used |
|---|---|---|---|---|---|
| MAX.DIM.PARTICLE SIZE (mm) | 6 | 4.5 | 6 | 4.5 | |
| SPECIFIC WEIGHT (kg/dm2) | 2.50 | 250 | 2.50 | 2.50 | UNI-10444 |
| FLEXURAL STRENGTH (N/mm2) | 14.50 | 17.50 | 14.0 | 17.0 | UNI-10443 |
| ABRASION RESISTANCE (mm2) | 440 | 460 | 440 | 460 | EN-102 |
| WATER ABSORPTION (% by weight) | 2.50 | 2.50 | 2.50 | 2.50 | UNI-10444 |

After curing for 28 days

The following examples describe the production of the cementitious products according to the present invention in non-limiting manner. With regard to the additives added to the binding mixes, these are normal additives for cementitious slurries for the functions indicated and the respective concentration ranges are given below:

dye: 0–4% of the weight of the cement, plasticizer (active substance): 1.5–2.0% of the weight of the cement, deaerating agent (active substance): 0.4–0.6% of the weight of the cement, retarder (active substance): 0.4–0.6% of the weight of the cement.

EXAMPLE 1

Marble was milled producing "run of mill" granulated material having the following particle-size composition:

| 0–0.6 mm | 8.2% by volume |
|---|---|
| 0.6–1.2 mm | 9.6% by volume |
| 1.2–2.5 mm | 17.5% by volume |
| 2.5–4.0 mm | 21.7% by volume |
| 4.0–6.0 mm | 15.5% by volume |

Water and white Portland cement were loaded into a cement mixer in a manner such that the quantity of cement was equal to 13.7% by volume relative to the total volume of the final mixture and the water was equal to 13.85% by volume.

After the water and the cement had been mixed intimately, the granulated marble filler was added and the additives mentioned above were also added. Sample slabs having dimensions of 40×40 cm and a thickness of 1.7 cm were then moulded, set and hardened under the conditions indicated above.

EXAMPLE 2

The method of Example 1 was repeated with the use of a granulated marble having the following particle-size composition, calculated by the application of Bolomey's formula:

| 0–0.045 mm (marble powder) | 2.0% by volume |
|---|---|
| 0.1–0.3 mm | 8.0% by volume |
| 1.2–2.5 mm | 28.8% by volume |
| 2.5–4.5 mm | 32.50% by volume |

The mixture was prepared by the mixing of the granulated material of the aforementioned composition with a binding mix of water and cement to include 14.3% by volume of white or grey Portland cement and 14.4% by volume of water, total, naturally as well as the additives already mentioned.

EXAMPLE 3

The method of Example 1 was repeated with the use of granulated marble material having the following particle-size composition:

| 0–0.045 mm (marble powder) | 2.0% by volume |
|---|---|
| 0.1–0.3 mm | 6.3% by volume |
| 1.2–2.5 mm | 8.6% by volume |
| 4.0–6.0 mm | 57.0% by volume |

The cement and water slurry was constituted by 13.0% by volume of white or grey Portland cement and by 13.1% by volume of water (total). In this case the particle-size selected clearly included a "jump" in particle-size.

EXAMPLE 4

The method of Example 1 was repeated with granulated "run of mill" granite produced by the milling of natural granite and having the following particle-size composition:

| 0.2–0.6 mm | 8.6% by volume |
|---|---|
| 0.6–1.2 mm | 12.5% by volume |
| 1.2–2.5 mm | 22.3% by volume |
| 2.5–4.5 mm | 25.9% by volume |

2.0% by volume of marble powder with a particle-size of 0–0.045 mm was added to this granulated material.

The cementitious binding mix to which the granulated granite was added comprised 14.3% by volume of white or grey Portland cement and 14.4% by volume of water, total.

EXAMPLE 5

Example 1 was repeated with granulated granite having a particle-size jump and having the following particle-size distribution:

| 0.1–0.3 mm | 6.0% by volume |
|---|---|
| 1.2–2.5 mm | 8.0% by volume |
| 4.0–6.0 mm | 56% by volume. |

In this case also the granulated material was supplemented with 2.0% by volume of marble powder with a particle-size of up to 0.045 mm.

The water and cement mixture in turn comprised 14.0% by volume of white or grey Portland cement and 14.0% by volume of water, total.

The physical and mechanical properties and characteristics of the slabs manufactured in accordance with the examples given above were determined producing the data given in Table 1 below, these data relating to slabs subjected to the customary 28 days curing.

TABLE 1

| Type of formulation | Specific weight (kg.dm³) UNI-10444 | Flexural strength (N/mm²) UNI-10443 | Abrasion resistance (mm³) EN-102 | Water Absorption (% by weight) UNI-10444 |
|---|---|---|---|---|
| Example No. 1 | 2.50 | 14.5 | 440 | 2.5 |
| Example No. 2 | 2.50 | 17.5 | 460 | 2.5 |
| Example No. 3 | 2.50 | 16.5 | 430 | 2.6 |
| Example no. 4 | 2.45 | 14.6 | 320 | 3.1 |
| Example No. 5 | 2,45 | 13.5 | 290 | 3.1 |

Block products, which afterwards were sawed in form of slabs have been manufactured, by the process of the present invention and the related plant as illustrated by in non-limiting manner the following examples. With regards to the additives added to the binding mixes these are again normal additives for cementitious slurries for the functions indicated and the respective concentration ranges are the same given beforehand.

EXAMPLE 6

Marble was milled producing "run of mill" granulated material having the following particle-size composition:

| | |
|---|---|
| 0–0.6 mm | 8.4% by volume |
| 0.6–1.2 mm | 10.0% by volume |
| 1.2–2.5 mm | 17.5% by volume |
| 2.5–4.0 mm | 22.0% by volume |
| 4.0–6.0 mm | 15.5% by volume |

Water and white Portland cement were loaded into a cement mixer in a manner such that the quantity of cement was equal to 13.7% by volume relative to the total volume of the final mixture and the water was equal to 12.90% by volume.

After the water and the cement had been mixed intimately, the granulated marble filler was added and the additives mentioned above were also added.

The operations for the forming of blocks of the size 250×125×100 cm have been then carried out.

The blocks were sawed in form of slabs 17 mm thick, which have been examined, both to detected possible porosity, both macroscopical and microscopical, and to determine the mechanical properties of interest for the final destination of the slabs.

EXAMPLE 7

The method of EXAMPLE 6 was repeated with the use of a granulated marble having the following particle-size composition, calculated by the application of Bolomey's formula:

| | |
|---|---|
| 0–0.045 mm (marble powder) | 2.0% by volume |
| 0.1–0.3 mm | 8.6% by volume |
| 1.2–2.5 mm | 28.8% by volume |
| 2.5–4.5 mm | 31.9% by volume |

The mixture was prepared by the mixing of the granulated material of the aforementioned composition with a binding mix of water and cement to include 14.3% by volume of white or grey Portland cement and 14.4% by volume of water, total, naturally as well as the additives already mentioned.

EXAMPLE 8

The method of Example 6 was repeated with the use of granulated marble material having the following particle-size composition:

| | |
|---|---|
| 0–0.045 mm (marble powder) | 2.0% by volume |
| 0.1–0.3 mm | 6.3% by volume |
| 1.2–2.5 mm | 8.6% by volume |
| 4.0–6.0 mm | 57.0% by volume |

The cement and water binding mix was constituted by 13.0% by volume of white or grey Portland cement and by 13.1% by volume of water (total). In this case the particle-size selected clearly included a "jump" in particle-size.

EXAMPLE 9

The method of Example 6 was repeated with granulated "run of mill" granite produced by the milling of natural granite and having the following particle-size composition:

| | |
|---|---|
| 0.2–0.6 mm | 8.6% by volume |
| 0.6–1.2 mm | 12.5% by volume |
| 1.2–2.5 mm | 22.3% by volume |
| 2.5–4.5 mm | 25.9% by volume |

2.0% by volume of marble powder with a particle-size of 0–0.045 mm was added to this granulated material.

The cementitious binding mix to which the granulated granite was added comprised 14.3% by volume of white or grey Portland cement and 14.4% by volume of water, total.

EXAMPLE 10

Example 6 was repeated with granulated granite having a particle-size jump and having the following particle-size distribution.

| | |
|---|---|
| 0.1–0.3 mm | 6.0% by volume |
| 1.2–2.5 mm | 7.0% by volume |
| 4.0–6.0 mm | 56.3% by volume |

In this case also the granulated material was supplemented with 2.0% by volume of marble powder with a particle-size of up to 0.045 mm.

The water and cement binding mix in turn comprised 14.0% by volume of white or grey Portland cement and 14.0% by volume of water, total.

By determing the physical and mechanical properties and characteristics of the slabs manufactured from block produced according to the proceeding examples 6 to 10, data substantially coincident with those already reported in the previous table 2 are obtained.

It is worth to notice that this substantial coincidence is obtained when the slabs are manufactured both from blocks undergoing the usual 28 days hardening and from blocks for which the hardening is carried out in a first phase with the block encompassed within an envelope of water proof plastic material and in the next phase, after sawing by maintaining the slabs for 23 days in a wet atmosphere.

From the above it is clear that the products of the present invention, in form both of slabs and of blocks, are therefore distinct from known cementitious products in composition, mechanical properties and aesthetic properties.

What is claimed is:

1. Method of manufacturing cementitious products consisting essentially of an inert granulated natural stone material and a cementitious matrix binding for filling voids and interstices of the granulated natural stone material, providing for the following steps:

a. providing an inert granulated natural stone material as a starting material having a predetermined and controlled particle size;
   b. calculating a void fraction of the inert granulated natural stone material and calculating a theoretical quantity of cementitious matrix binding sufficient to fill the voids and interstices of the granulated natural stone material from the calculated void fraction;
   c. preparing a cementitious matrix binding for filling voids and interstices of the inert granulated natural stone material consisting essentially of a water and cement slurry having a water content of between 0.25 and 0.36 parts by weight relative to the weight of the cement wherein the water and cement slurry is supplemented with a quantity of a known plasticizing additive for cementitious slurries such that, when the cementitious matrix binding is subjected to a "mini slump" test, the cementitious matrix binding has a fluidity such that the cementitious matrix binding can be arranged in a very thin layer with a rounded shape having a diameter of about 20 cm;
   d. intimately mixing the inert granulated natural stone material and a quantity of the cementitious matrix binding such that the quantity of the cementitious matrix binding is slightly in excess of the theoretical quantity of the cementitious matrix binding calculated from the calculated void fraction of the inert granulated natural stone material;
   e. spreading the mixture of step (d) in a forming device to form a layer of desired thickness in the forming device;
   f. deaerating the layer in the forming device by applying a very high vacuum of not less than 40 mm Hg to the layer in the forming device for a period which is very short but long enough to bring about a substantially complete deaeration of the interstices and to remove all air remaining incorporated in the layer to form a deaerated layer;
   g. applying a vibratory motion with a frequency of between 2000 and 4800 cycles per minute to the deaerated layer upon termination of the deaeration step under high vacuum of not less than 40 mm Hg and under a lower vacuum than that of the deaeration step between 70 and 80 mm Hg for a period of a few tens of seconds to about 3 minutes to provide relative settling of particles of the inert granulated natural stone material in the deaerated layer and surface closing of the deaerated layer;
   h. transferring the forming device to a setting and initial hardening section; and
   i. removing the product from the forming device and keeping of the product on shelves for a final hardening of the product.

2. Method according to claim 1, wherein the starting material is a product resulting directly from a milling and granulation of natural stone material.

3. Method according to claim 1, wherein the starting material has a particle-size composition calculated according to Fuller-Thompson's formula or to Bolomey's formula.

4. Method according to claim 1, wherein the starting material has a particle size of between 0.1 and 6 mm.

5. Method according to claim 1, wherein the quantity of the cementitious matrix binding which is slightly in excess of the theoretical quantity of the cementitious matrix binding is in excess by 10%.

6. Method according to claim 1, wherein the deaeration step is carried out with a vacuum of 40 mm Hg and for a period of 20 seconds.

7. Method according to claim 1, wherein the step of applying a vibratory motion is carried out by applying a vibratory motion with a frequency of 3000 cycles per minute and for a period of 4 to 5 minutes.

8. Method according to claim 1, wherein the starting material is selected from the group consisting of granulated marble, granite and ceramic material which has been milled to a desired particle size.

9. Method according to claim 1, wherein the intimate mixing step and the spreading step are carried out under vacuum when the cementitious product to be obtained has a thickness not less than 5 cm.

10. Method according to claim 1, wherein the vibratory motion is applied for a period of at least 60 seconds when the cementitious product to be obtained has a thickness not higher than 5 cm.

11. Method according to claim 1, wherein for manufacturing of the cementitious products which have a thickness higher than 5 cm, the mixing step takes place under a controlled vacuum to prevent the water contained in the mixture of the inert granulated natural stone material and the cementitious matrix binding in the mixing step from boiling.

12. Method according to claim 11 wherein the controlled vacuum is not higher than 70 mm Hg.

13. Method according to claim 11, wherein the final hardening during step (i) takes place in two phases, including a first phase (h1) having a duration of at least 7 days and which maintains the cementitious product in a condition protected from evaporation of the water towards a surrounding atmosphere and a second phase (h2) having a duration of the number of days necessary for completion of hardening.

14. Method according to claim 1, wherein the cementitious matrix binding includes inert material in finely milled form.

15. Method according to claim 14, wherein the inert material is added in substitution for part of a cement ingredient of the cement slurry.

16. Method according to claim 14, wherein the inert material is calcium carbonate.

17. Plant for the manufacture of cementitious slab products from a mixture consisting essentially of an inert granulated natural stone material and a cementitious matrix binding consisting essentially of a slurry of cement, water and a plasticizing additive for cementitious slurries, wherein the plant comprises:

A. a raw material stocking and supply section comprising a number of silos and hoppers for stocking of the inert granulated natural stone material and the cement for the preparation of a starting mixture and corresponding devices for dosing of the inert granulated natural stone materials and the cement to weighing equipment;

B. A mixing section for preparing a cementitious matrix binding having a water content of between 0.25 and 0.36 parts by weight relative to the weight of the cement for filling voids and interstices of the inert granulated natural stone material from ingredients coming from the weighing equipment together with water and the plasticizing additive comprising a mixer for thoroughly mixing of the inert granulated natural stone material and a quantity of the cementitious matrix binding slightly in excess of a theoretical quantity of the cementitious matrix binding calculated from a void fraction of the inert granulated stone material;

C. a section for a dosed and homogeneously uniform filling of at least one forming device with the mixture formed in the mixer to form a layer of desired thickness in the at least one forming device;

D. a combined section for deaeration and settling of the layer in the at least one forming device comprising first vacuum generating means for subjecting a surface of the layer in the forming device to a predetermined vacuum, means for controlling and regulating the first vacuum generating means acting onto the surface of the layer and vibration generating means for applying to the layer in the forming device a vibratory motion having a frequency of between 2000 and 4800 cycles/min and for a short time but not less than for a period of at least 60 seconds, wherein the means for controlling and regulating the first vacuum generating means is adapted to cause the first vacuum generating means to generate firstly a very high vacuum not less than 40 mm Hg for a period which is very short but long enough to bring about a substantially complete deaeration of the interstices and to remove all air remaining incorporated in the layer to form a deaerated layer before the vibratory motion and then to generate a vacuum lower than the previous vacuum between 70 and 80 mm Hg for a period of a few tens of seconds to about 3 minutes to provide relative settling of the particles of the inert granulated natural stone material in the deaerated layer and surface closing of the deaerated layer during the vibratory motion;

E. a setting and initial hardening section for setting and initial hardening of the layer in the at least one forming device to form a product; and F. a section for removal of the product from the at least one forming device and for maintaining at rest the product for a hardening phase.

18. Plant according to claim 17, wherein, in the combined section for deaeration and settling of the layer in the at least one forming device, the vibration generating means generates a vibratory motion at a frequency of 3000 cycles per minute.

19. Plant according to claim 17, wherein, in the setting and initial hardening section, setting and initial hardening takes place at a temperature of between 25° C. and 35° C.

20. Plant according to claim 17, wherein the setting and initial hardening section comprises a number of chambers where the at least one forming device is maintained at rest for a time of the order of 24 hours.

21. Plant according to claim 20, wherein the chambers are fed with steam to saturate their internal atmosphere.

22. Plant according to claim 17, wherein:
for manufacturing of cementitious products having a thickness not greater than 5 cm, the at least one forming device consists of a tray or trays and the first vacuum generating means in the deaeration and settling combined section, the first vacuum generating means comprises a vacuum bell shaped tank which engages the entire surface of the tray or trays containing the layer.

23. Plant according to claim 22, wherein the at least one forming device includes a number of trays.

24. Plant according to claim 23, wherein the bell shaped tank is shaped to fully encompass a whole upper surface of the trays.

25. Plant according to claim 17, wherein
for manufacturing of cementitious products having a thickness higher than 5 cm, second vacuum generating means are provided in the mixing section whereby mixing the mixer takes place under a controlled and regulated vacuum to thereby prevent the water contained in the mixer from boiling.

26. Plant according to claim 25, wherein the at least one forming device includes a form for casting of cementitious products, the section for a dosed and homogeneously uniform filing of at least one forming device consists of a forming chamber communicating through valve means with a discharge opening of the mixer and adapted to temporarily receive the form.

27. Plant according to claim 26, wherein the forming device is supported on a saddle movable with an alternating horizontal translation motion, whereby a mouth of the forming device is alternatively moved with respect to the discharge opening of the mixer between two end positions thus ensuring uniform distribution of the mixture within the forming device.

28. Plant according to claim 27, wherein the vibration generating means are connected to the supporting saddle whereby the vibratory motion is applied to the supporting saddle within the forming chamber.

29. Plant according to claim 27, wherein the at least one forming device includes a second form receiving a vacuum chamber, the vacuum chamber being housed in the combined section for deaeration and settling of the layer in the at least one forming device, the vibratory motion is applied to the supporting saddle within the vacuum chamber, and the vacuum in the vacuum chamber is controlled and regulated by the means for controlling and regulating the first vacuum generating means.

30. Plant according to claim 29, wherein the vacuum chamber is connected to a vacuum source operating for the forming chamber and for the mixer.

* * * * *